United States Patent [19]

Dang et al.

[11] Patent Number: 5,787,446
[45] Date of Patent: Jul. 28, 1998

[54] SUB-VOLUME WITH FLOATING STORAGE SPACE

[75] Inventors: Chi-Hung Dang; Chi-Thanh Dang, both of Tucson, Ariz.

[73] Assignee: International Business Machines Corporation, Armonk, N.Y.

[21] Appl. No.: 879,104

[22] Filed: Jun. 19, 1997

Related U.S. Application Data

[63] Continuation of Ser. No. 511,564, Aug. 3, 1995, abandoned.

[51] Int. Cl.⁶ .................................................. G06F 17/30
[52] U.S. Cl. .................................................... 707/205
[58] Field of Search ........................ 707/1, 2, 10, 200, 707/205

[56] References Cited

U.S. PATENT DOCUMENTS

| | | | |
|---|---|---|---|
| 4,152,764 | 5/1979 | Connors et al. | 364/200 |
| 4,672,539 | 6/1987 | Goertzel | 364/300 |
| 4,884,199 | 11/1989 | Boothroyd et al. | 364/408 |
| 5,018,060 | 5/1991 | Gelb et al. | 395/621 |
| 5,060,090 | 10/1991 | Kobayashi et al. | 360/71 |
| 5,197,055 | 3/1993 | Hartung et al. | 369/34 |
| 5,204,756 | 4/1993 | Chevion et al. | 358/426 |
| 5,239,647 | 4/1993 | Anglin et al. | 395/600 |
| 5,239,650 | 8/1993 | Hartung et al. | 395/650 |
| 5,287,459 | 2/1994 | Gniewek | 395/275 |
| 5,289,589 | 2/1994 | Bingham et al. | 395/425 |
| 5,305,295 | 4/1994 | Chu | 369/30 |
| 5,317,328 | 5/1994 | Tevis et al. | 395/600 |
| 5,388,260 | 2/1995 | Monahan et al. | 395/600 |
| 5,394,534 | 2/1995 | Kulakowski et al. | 395/425 |
| 5,412,791 | 5/1995 | Martin et al. | 395/441 |
| 5,491,810 | 2/1996 | Allen et al. | 395/438 |
| 5,495,603 | 2/1996 | Fruchtman et al. | 395/616 |
| 5,504,889 | 4/1996 | Burgess | 395/616 |
| 5,544,360 | 8/1996 | Lewak et al. | 395/601 |
| 5,546,557 | 8/1996 | Allen et al. | 395/438 |
| 5,572,422 | 11/1996 | Nematbakhsh et al. | 395/203 |
| 5,579,516 | 11/1996 | Van Maren et al. | 395/601 |

*Primary Examiner*—Thomas G. Black
*Assistant Examiner*—John C. Loomis
*Attorney, Agent, or Firm*—Gray Cary Ware Freidenrich

[57] ABSTRACT

A file management system facilitates both physical and logical file groupings with convenient access to surplus media for sub-volume expansion. Each item of media includes a local file directory, which provides a list of files stored on the medium, cross-referenced to the files' addresses on the medium. The media items are organized as one or more primary sub-volumes, an auxiliary sub-volume, and a media reservoir. Each primary sub-volume preferably comprises a single sub-directory, and includes one or more media items used to store files of a specific class. Initially each primary sub-volume includes a single piece of media. The library also includes at least one auxiliary sub-volume, which may include multiple sub-directories, to store leftover files that do not fall under classes corresponding to the primary sub-volumes. Files may be stored on the auxiliary sub-volume on a random, "space available" basis. A media reservoir includes a bank of new, erased, or re-formatted media items available for individual inclusion into the primary and auxiliary sub-volumes as these sub-volumes expand.

27 Claims, 7 Drawing Sheets

SUB-VOLUME WITH FLOATING STORAGE SPACE

This application is a continuation of application Ser. No. 08/511,564, filed Aug. 3, 1995, now abandoned.

BACKGROUND OF THE INVENTION

1. Field of the Invention

The present invention relates to the storage of machine-readable files in a library of storage devices. More particularly, the invention concerns a file management system that facilitates both physical and logical file groupings, with convenient access to surplus media items available for sub-volume expansion.

2. Description of the Related Art

File management is one of the most important aspects in the operation of a data storage library. Known libraries subdivide their storage space into a number of sub-volumes, each containing a fixed number of media items. The files stored in a single sub-volume are related to each other. Therefore, all files concerning a particular application or subject matter are physically portable, by simply removing the item(s) of media containing the applicable sub-volume. Additionally, this facilitates a simple the "common file directory", which lists the identity and location of each media item corresponding to each sub-volume.

For some users, however, this file management system may not be completely adequate. For example, the file management software may be excessively complicated, because the physical storage space must be predetermined based on the specific application. In some cases, this may lead to incompatibility between the file system and platter management. Moreover, this file management system may not be efficient enough for some users. In particular, complications may arise if the user desires to store certain files in a sub-volume, where those files occupy more space than that pre-allocated for that sub-volume. Conversely, storage space is wasted if storage capacity is reserved for a sub-volume but never actually used.

SUMMARY OF THE INVENTION

The present invention concerns a file management system that facilitates both physical and logical file groupings, with convenient access to surplus media items for sub-volume expansion. As an example, this system may be implemented in a mass storage system that uses a library with multiple items of media, such as optical disks, magnetic disks, or other storage devices. A conveyor transfers media items between the storage library and a storage drive, which conducts read and write operations upon the media items. The conveyor and storage drive are managed by a controller, which may receive instructions from a host.

Each piece of media includes a local file directory that provides a list of files stored on the medium, cross-referenced to the files' addresses on the medium. The media items are organized as one or more primary sub-volumes, an auxiliary sub-volume, and a media reservoir. Each primary sub-volume includes one or more media items that are used to store files of a specific class. Initially, each primary sub-volume includes a single piece of media. Each of the primary sub-volumes preferably comprises a single sub-directory.

The library also includes at least one auxiliary sub-volume. The auxiliary sub-volume stores files that do not fall under any of the classes covered by the primary sub-volumes. As such, the auxiliary sub-volume is used to store leftover files. Files may be stored on the auxiliary sub-volume randomly, i.e. on a "space available" basis, where there is no requirement to store a file on any particular media item. The auxiliary sub-volume may include any number of sub-directories. There is no requirement to physically group files that happen to be organized in the same sub-directory. The sub-directory may manage its files using, for example, a data structure such as a linked list, to encourage random storage of the files.

A media reservoir includes a bank of media items that are available for individual inclusion into the primary and auxiliary sub-volumes when these sub-volumes expand. These media items are preferably new, erased, re-formatted, or otherwise free from stored data. The media reservoir also receives media items relinquished by the primary and auxiliary sub-volumes when these sub-volumes shrink.

As mentioned above, to locate a file stored in a particular item of media, the controller uses that media item's local file directory. Prior to this step, however, the controller must identify the item of media that contains the file. To perform this step, the controller preferably uses a common file directory containing a list of all files individually cross-referenced to the items of media containing those files.

The invention affords its users with a number of distinct advantages. For example, the invention efficiently uses storage space of a mass storage library by efficiently allocating and de-allocating storage space to sub-volumes as needed. Also, the invention provides physically portable sub-volumes of content-grouped files, as well as a content-independent auxiliary sub-volume to contain randomly stored files.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Broadly, the present invention concerns a file management method and apparatus, facilitating both physical and logical file groupings, providing convenient access to surplus media items for sub-volume expansion.

Structure

Hardware Components & Interconnections

Figure 1:
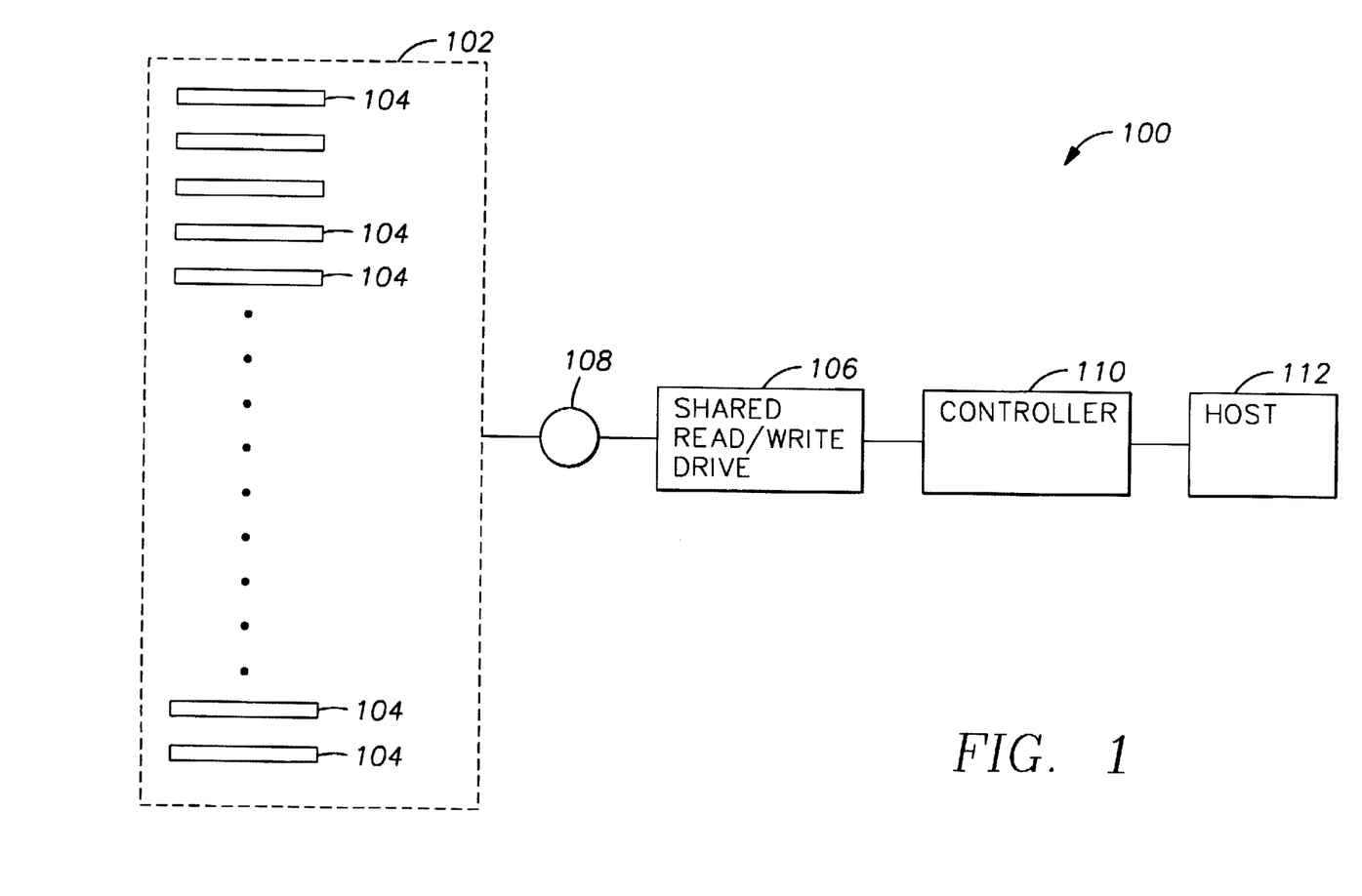
FIG. 1 is a diagram of the hardware components and interconnections of the invention.

The file management system, as an example, may be implemented in a mass storage system having the hardware components and interconnections shown in FIG. 1. In particular, FIG. 1 illustrates a mass storage system 100 that includes a library 102 containing multiple pieces of media 104. Each piece of media 104 may comprise, for example, an optical disk, a magnetic disk, a magnetic tape, or another storage device.

The system 100 also includes a shared read/write drive 106, comprising an appropriate hardware device to read and write data to/from the media 104. To convey pieces of media 104 to the read/write drive 106, the system 100 may include a conveyor 108. As an example, the conveyor 108 may comprise: (1) mechanical linkage to move a read/write head from magnetic disk to magnetic disk, (2) a picker, such as a robotic arm, to grab an optical cartridge from a library and insert the optical cartridge into an optical drive, or (3) another suitable hardware device.

The read/write drive 106 is electrically coupled to a controller 110. The controller 110 receives read/write requests from a host 112, and executes these requests upon the media 104. More specifically, the controller 1 10 manages the exchange of media 104 between the storage library and the drive 106, and also manages the drive's reading/writing of data to/from the media 104. Many different models of controller are known in the art. The controller 110 may comprise a hardware device such as a microprocessor, for example.

Data Storage

Another aspect of the present invention includes a data storage scheme, which may be implemented in the hardware environment described above. First, each piece of media 104 includes a local file directory. A medium's local file directory provides a list of files stored on the medium, cross-referenced to the files' addresses on the medium. A local file directory may also include further data for each file, such as the file's type, size, position, file protection status, usage count, date, and process identification.

Figure 2:
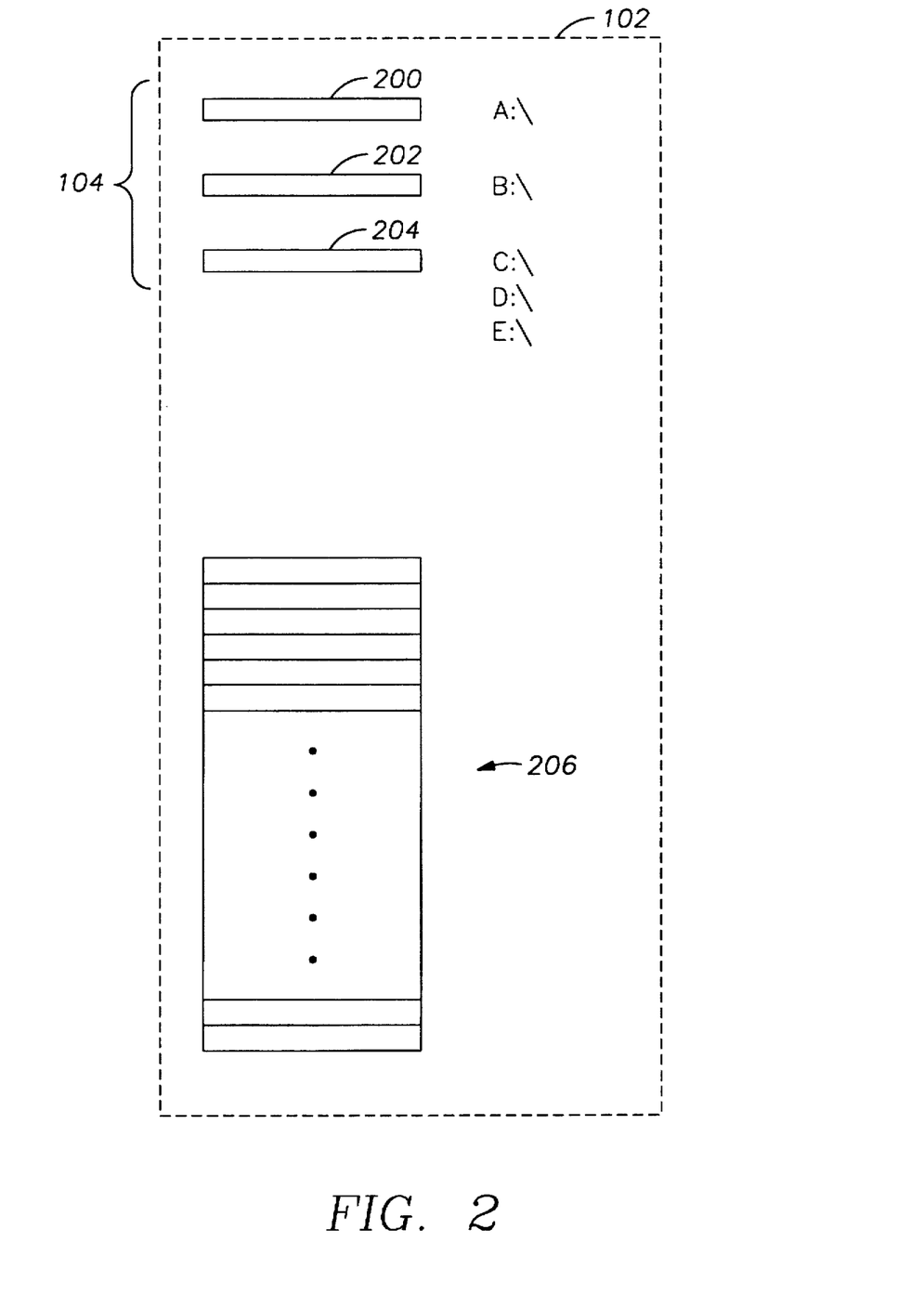
FIG. 2 is a diagram of the library configuration of the invention.

FIG. 2 describes how the pieces of media 104 are organized. Broadly, the media 104 are organized as one or more primary sub-volumes, an auxiliary sub-volume, and a media reservoir. Each primary sub-volume includes one or more media items that are used to store files of a specific class.

For example, a primary sub-volume may be used to store all tax files from the year 1995. Thus, all tax files from the year 1995 may be easily removed from the library 102 simply by removing the media items that make up that sub-volume. Additional primary sub-volumes may be designated, for example, to store tax data for the years 1994 and 1993.

Initially each primary sub-volume includes a single piece of media. The example of FIG. 2 depicts a first primary sub-volume 200 and a second primary sub-volume 202, each comprising a single media item.

Each of the primary sub-volumes preferably comprises a single sub-directory. In this case, the primary sub-volumes 200 and 202 may be identified by sub-directories "A" and "B". Under a disk operating system such as IBM OS/2, access to a file on the sub-volume 200 is accomplished by specifying the filepath as shown in Equation 1.

$$\text{Filepath}=X{:}\backslash A\backslash \text{FILENAME} \quad [1]$$

where:

"X" identifies the drive (here, the storage library 102);

"A" identifies the subdirectory (here, the primary sub-volume 200); and

"FILENAME" identifies the name of the file for which access is sought.

With this filepath, the desired file may be read or written to/from the appropriate item of media from the primary sub-volume 200, whether the sub-volume 200 includes one or many different media items.

The library 102 also includes at least one auxiliary sub-volume 204. The auxiliary sub-volume 204 functions to store files that do not fall under classes corresponding to the primary sub-volumes. The auxiliary sub-volume 204 is therefore used to store leftover files. Files may be stored on the auxiliary sub-volume 204 randomly, i.e. files are stored on a "space available" bases, where there is no requirement to store a file on any particular media item.

However, the auxiliary sub-volume 204 may include any number of sub-directories. In the example of FIG. 2, the auxiliary sub-volume 204 may be identified by sub-directories "C", "D", and "E". Under a disk operating system such as IBM OS/2, then, access to a file on the sub-volume 204 is accomplished by specifying the filepath, as shown in Equation 2.

$$\text{Filepath}=X{:}\backslash {*}\backslash C\backslash \text{FILENAME} \quad [1]$$

where:

"X" identifies the drive (here, the storage library 102);

"C" identifies the subdirectory (here, the media reservoir 204);

"*" designates storage in the media reservoir 204;

"FILENAME" identifies the name of the file for which access is sought.

With this filepath, the desired file may be read or written to/from the appropriate item of media from the primary sub-volume 204, whether the sub-volume 204 includes one or many different media items.

Furthermore, there is no requirement to physically group files that happen to be organized in the same sub-directory. The sub-directory may manage its files using, for example, a data structure such as a linked list, to encourage random storage of the files.

In organizing the media 104, a media reservoir 206 is also provided. The media reservoir 206 includes a bank of media items that are available for individual inclusion into the primary and auxiliary sub-volumes as these sub-volumes expand. These media items are preferably new, erased, re-formatted, or otherwise free from stored data. The media reservoir also receives media items relinquished by the primary and auxiliary sub-volumes when these sub-volumes shrink.

As mentioned above, to locate a file stored in a particular item of media, the controller 110 uses that media item's local file directory. Prior to this step, however, the controller 110 must identify the item of media that contains the file. To perform this step, the controller 110 preferably uses a common file directory containing a list of all files individually cross-referenced to the items of media containing those files. Preferably, this file directory comprises a compressed common file directory ("CCFD"), as described in co-pending U.S. patent application Ser. No. 08/510,995, entitled "Compressed Common File Directory for Mass Storage Systems," filed on Aug. 3, 1995 and now U.S. Pat. No. 5,778,374 in the names of C. H. Dang et al., which is hereby incorporated by reference in its entirety. During operation of the system 100, the CCFD may be stored, for example, in a storage device integrated with or coupled to the controller 110, such as a disk drive or a RAM circuit.

Operation

Write

Figure 3A:
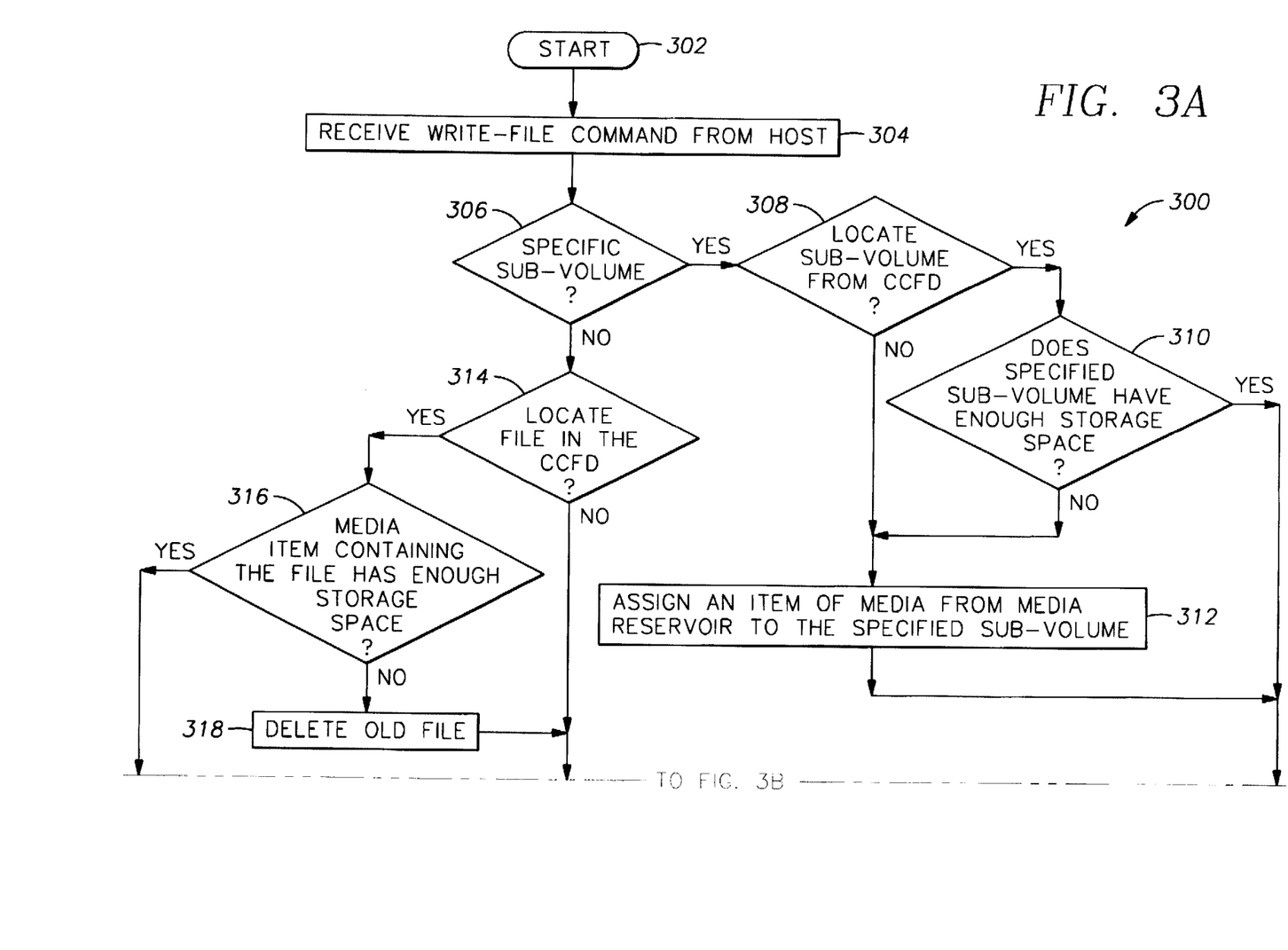
FIGS. 3A–3B contain a flowchart depicting an exemplary sequence of steps to write files to mass storage pursuant to the invention.
Figure 3B:
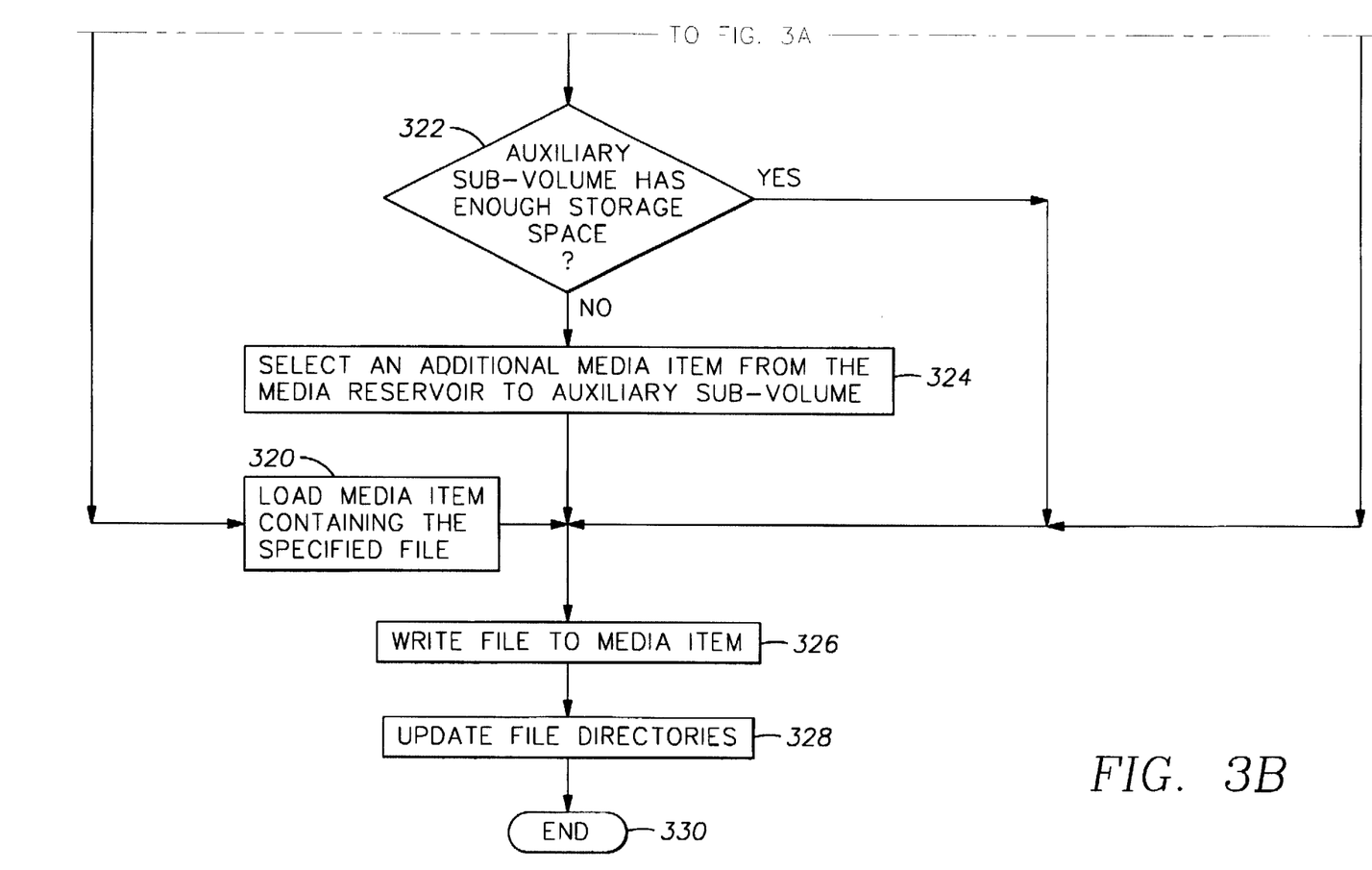

In addition to the apparatus aspect of the invention exemplified by the hardware components and interconnections discussed above, the, present invention contemplates various methods of file management in a mass storage system. FIGS. 3A–3B, for example, depict a sequence 300 for writing files to a storage library configured pursuant to the invention. For ease of understanding, the sequence 300 is described in the context of the hardware environment of FIGS. 1–2.

After the routine 300 begins in task 302, the controller 110 in task 304 receives a "write-file" command from the host 112. This command instructs the controller 110 to write a file to the library 102, and includes specification of a desired filename in the format of Equations 1–2. This command may originate, for example, from a user of the system 100. This command may comprise a "copy-file" command, instead.

Next, query 306 asks whether the command of task 304 specifies a particular sub-volume (i.e. one of the primary sub-volumes 200 or 202) for its write operation. If so, query 308 attempts to locate the requested sub-volume using the CCFD. If query 308 locates the sub-volume, query 310 asks whether the specified sub-volume has sufficient storage space to write the present file. If so, the drive 106 writes the file in task 326, and the controller 110 oversees updating of the local and common file directories in task 328.

If the specified sub-volume is not located in query 308, or the specified sub-volume lacks sufficient storage space to store the present file, task 312 assigns an item of media from the media reservoir 206 to the specified sub-volume. If task 312 is performed after a negative answer to query 308, task 312 involves creating the sub-volume. If task 312 is performed after a negative answer to query 310, task 312 involves simply adding an item of media to the already-existing sub-volume.

Finally, the drive 106 writes the file to the proper item of media 104 in task 326. Then, the controller 110 updates the affected file directories, such as the CCFD, in task 328. After task 328, the routine 300 ends in task 330.

As discussed above, query 306 asks whether the write command specified in task 304 identifies a particular sub-volume (i.e. one of the primary sub-volumes 200 or 202) for its write operation. If so, control advances through steps 308, 310, and 312 as discussed above. If not, however, control advances to query 314, which attempts to locate the requested sub-volume using the CCFD. If query 314 locates the sub-volume, query 316 asks whether the item of media containing the file has sufficient storage space to receive the new file. If so, the conveyor 108 loads the identified item of media in task 320.

If the identified piece of media lacks sufficient storage space, query 316 directs control to task 318, which first deletes the old version of the file, and then proceeds to query 322. If the item of media still lacks sufficient storage space to store the new file, the controller 110 in task 324 selects an additional item of media from the media reservoir 206 and assigns it to the auxiliary sub-volume 204.

After the applicable one of steps 324, 322, or 320, the drive 106 writes the new file to the loaded item of media in task 326. Then, in task 328 the controller 110 updates the file directories, including the CCFD, and the routine 300 ends in task 330.

Delete

Figure 4:
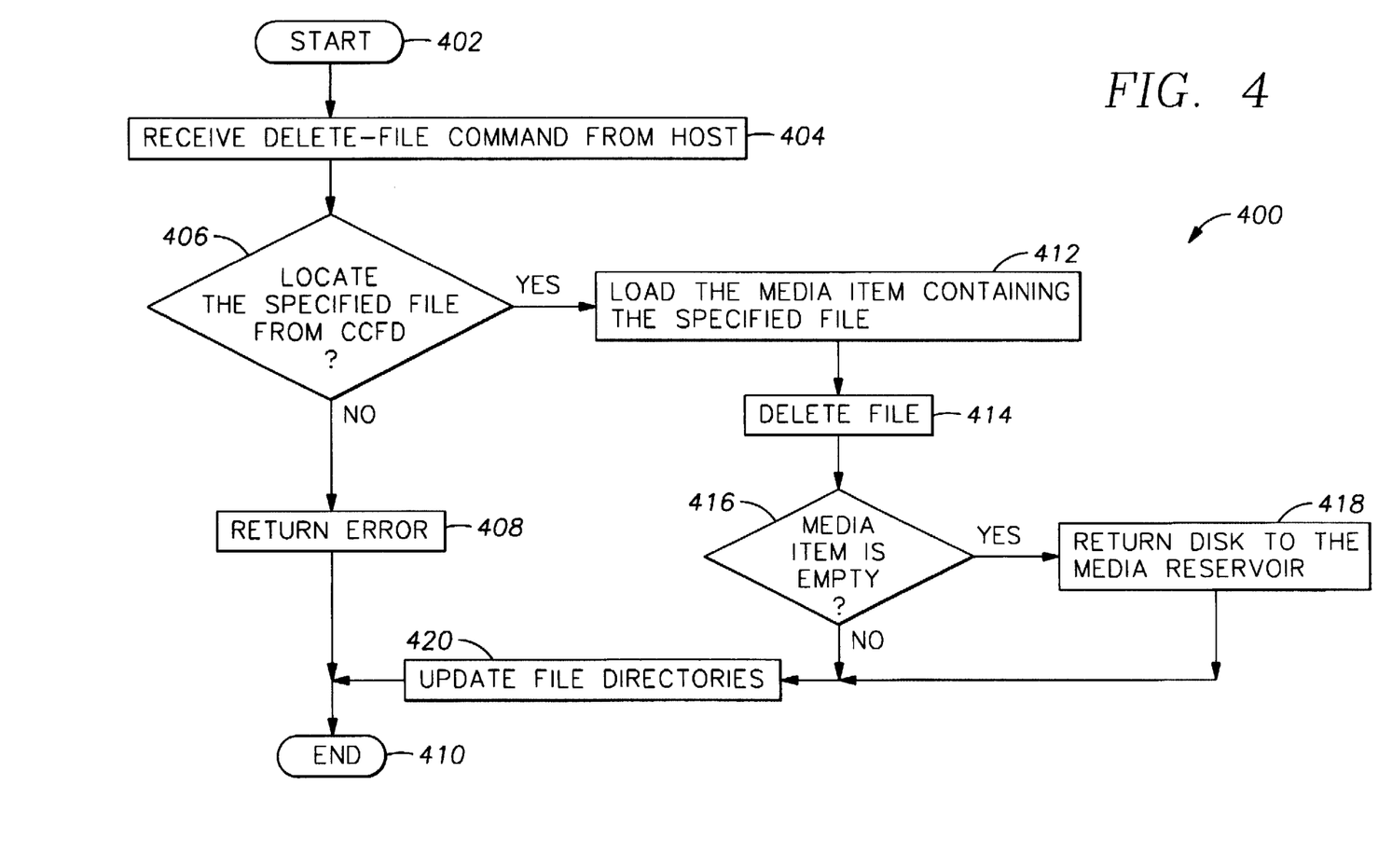
FIG. 4 is a flowchart depicting an exemplary sequence of steps to delete files from mass storage pursuant to the invention.

FIG. 4 depicts a sequence 400 for deleting files from a storage library that is configured in accordance with the invention. For ease of understanding, the sequence 400 is described in the context of the hardware environment 100 of FIG. 1. After the routine 400 begins in task 402, the controller 110 receives a "delete-file" command from the host 112. This command instructs the controller 110 to delete a file from the library 102, and includes specification of a desired filename in the format of Equations 1–2. This command may originate, for example, from a user of the system 100.

Next, query 406 attempts to locate the requested sub-volume using the CCFD. If query 314 cannot locate the sub-volume, the controller 110 returns an error message to the host 112 in task 408, and the routine 400 ends in task 410.

If query 406 does locate the specified file, the conveyor 108 in task 412 loads the media item containing the specified file. Then, task 414 deletes the file from that media item. Query 416 then asks whether the media item is empty. If so, task 418 physically returns the media item to the media reservoir 206. After task 418, or a negative answer to query 416, the controller 110 task 420 updates the affected file directories, including the CCFD, to reflect the deleted file's absence. After task 420, the routine ends in task 410.

Export Sub-Directory

Figure 5:
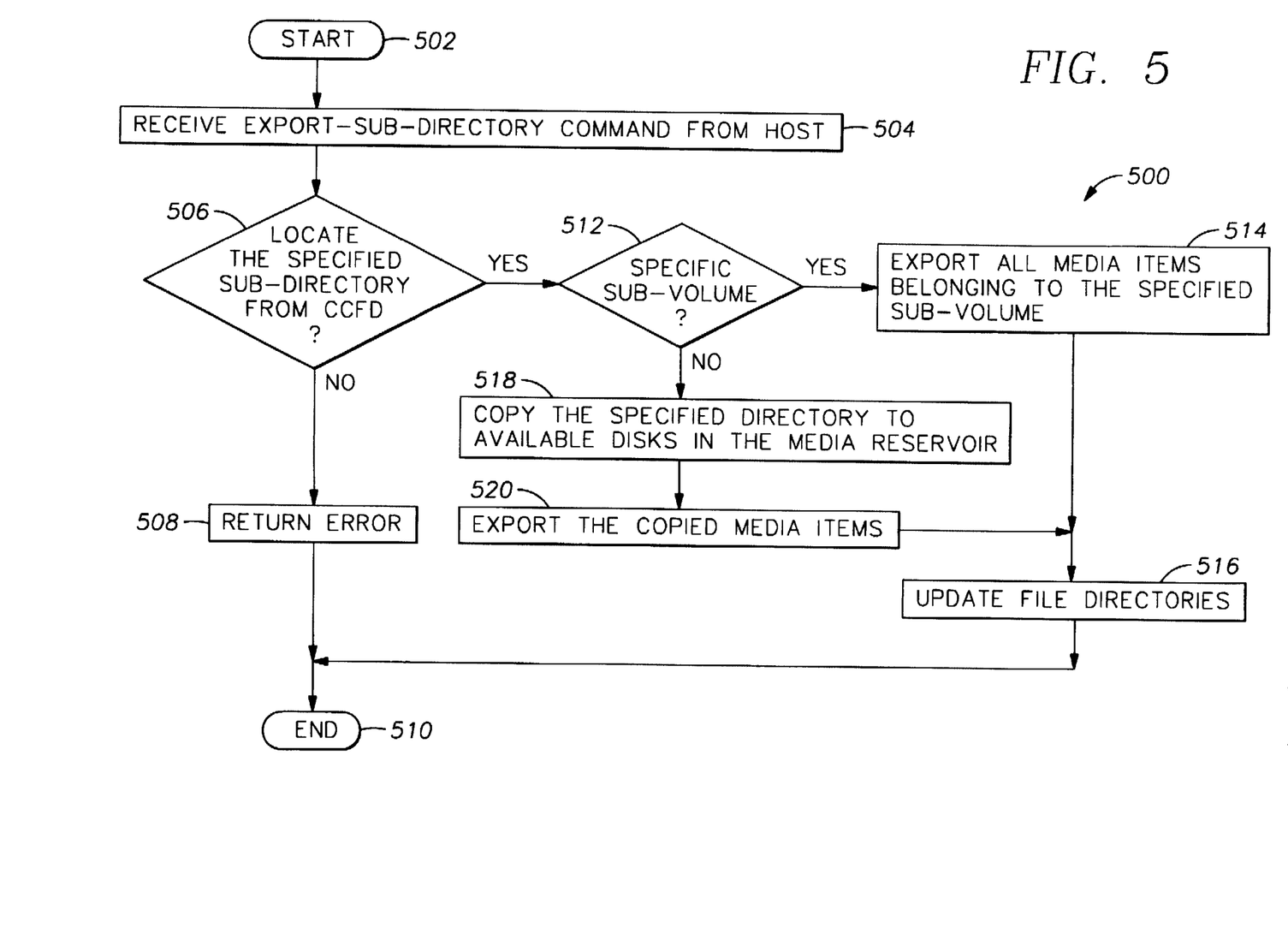
FIG. 5 is a flowchart depicting an exemplary sequence of steps to export a sub-directory from mass storage pursuant to the invention.

FIG. 5 depicts a sequence 500 for "exporting" sub-directories from a storage library that is configured in accordance with the invention. The operation of exporting a sub-directory involves placing or ensuring placement of a sub-directory one or more items of media for removal from the library. This may be useful, for example, if a user wishes to transfer a specific class of data files to another storage system. For ease of understanding, the sequence 500 is described in the context of the hardware environment 100 of FIG. 1.

After the routine 500 begins in task 502, the controller 110 receives an "export-subdirectory" command from the host 112. This command instructs the controller 110 to export an entire sub-directory from the library 102, and includes specification of a desired filename in the format of Equations 1–2. This command may originate, for example, from a user of the system 100.

After task 504, query 506 attempts to locate the requested sub-volume using the CCFD. If query 506 cannot locate the sub-volume, the controller 110 returns an error message to the host 112 in task 508, and the routine 500 ends in task 510.

If query 506 locates the sub-directory, however, control advances to query 512, which asks whether the specified sub-directory corresponds to a specific sub-volume, i.e. one of the primary sub-volumes 200, 202. If so, the sub-directory can be exported simply by removing the constituent media items. Accordingly, the controller 110 in task 514 exports all media items that belong to the specified sub-volume. Then, the controller 110 updates all affected file directories, including the CCFD, in task 516. After task 516, the routine 500 ends in task 510.

On the other hand, task 518 is performed if query 512 determines that the specified sub-directory does not correspond to a specific sub-volume. In this case, the specified sub-directory exists, along with various other sub-directories, in the auxiliary sub-volume 204. Accordingly, the controller 110 in task 518 copies all files of the specified sub-directory to the necessary number of media items of the media reservoir 206. Then, the conveyor 108 exports these media item(s) in task 520, the controller 100 updates the file directories as needed in task 516, and the routine 500 ends in task 510.

Export Files

Figure 6:
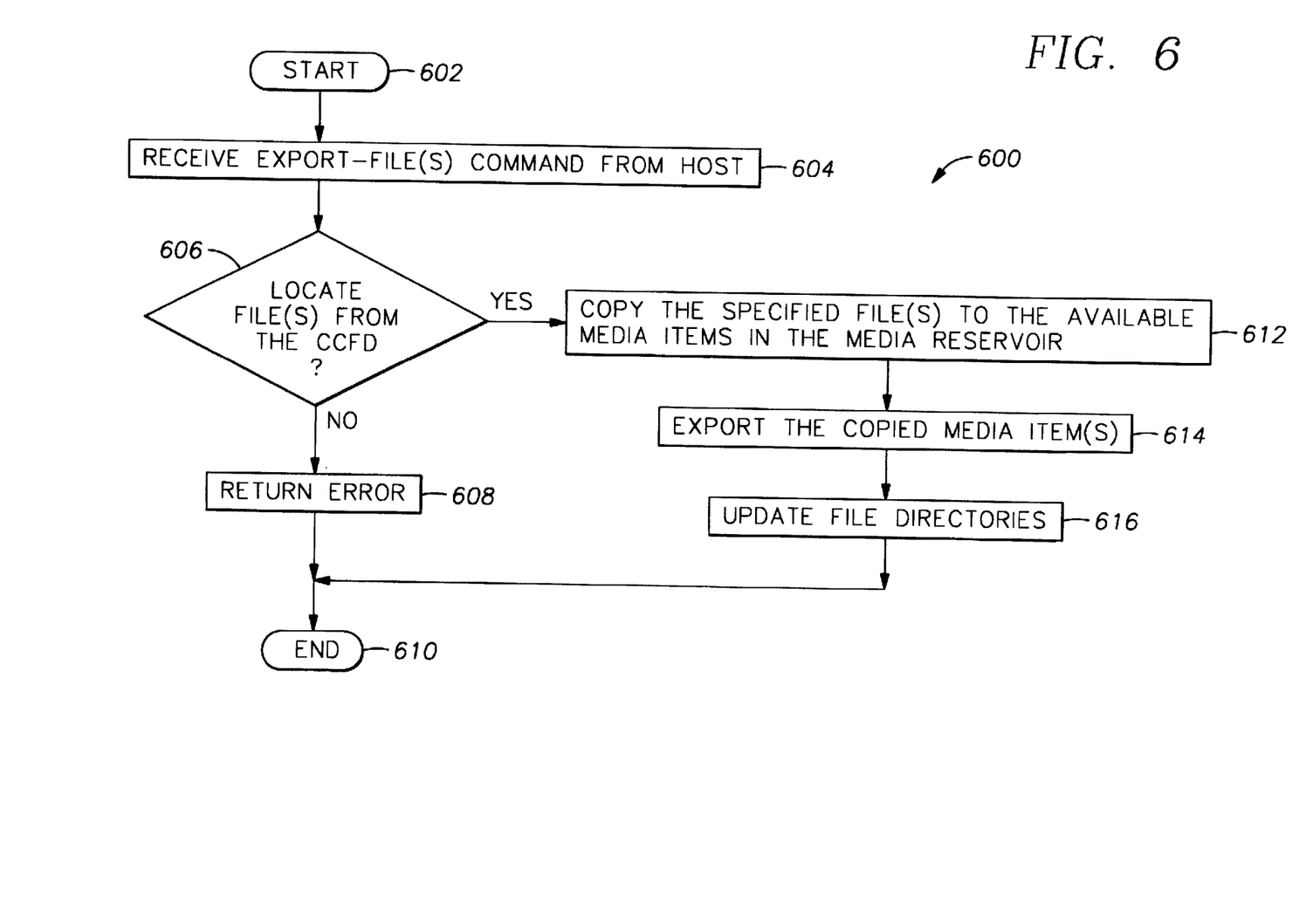
FIG. 6 is a flowchart depicting an exemplary sequence of steps to export a file from mass storage pursuant to the invention.

FIG. 6 depicts a sequence 600 for exporting files from a storage library that is configured in accordance with the invention. The operation of exporting a file involves placing a copy of the file onto one or more items of media for removal from the library. This may be useful, for example, if a user wishes to transfer one or more specific files to another storage system. For ease of understanding, the sequence 600 is described in the context of the hardware environment 100 of FIG. 1.

After the routine 600 begins in task 602, the controller 110 receives an "export-file(s)" command from the host 112. This command instructs the controller 110 to export one or more files from the library 102, and includes specification of the desired filenames in the format of Equations 1–2. This command may originate, for example, from a user of the system 100.

After task 604, query 606 attempts to locate the requested file(s) using the CCFD. If query 606 cannot locate the file(s), the controller 110 returns an error message to the host 112 in task 608, and the routine 600 ends in task 610.

If query 606 locates the file(s), however, control advances to task 612, in which the controller 110 copies the specified file(s) to one or more media items from the media reservoir 206. Then, the conveyor 108 exports these media items in task 614 by removing them from the library 102. After the controller 110 updates the file directories in task 616, the routine 600 ends in task 610.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A method for managing file storage in a data storage library, comprising the steps of:
   establishing a primary sub-volume by designating a first predetermined number of media items for storage of a first class of files and storing files of the first class in the primary sub-volume;
   establishing a secondary sub-volume by designating a second predetermined number of media items for storage of a second class of files and storing files of the second class in the secondary sub-volume;
   establishing an auxiliary sub-volume by designating a third predetermined number of media items for storage of files not of the first or second classes;
   establishing a file directory listing files contained in the primary and secondary sub-volumes;
   receiving a command to store a file;
   if the command requests storage of the file in a specified sub-volume, determining whether the specified sub-volume has sufficient storage space to contain the file;
      if the specified sub-volume has sufficient storage space to contain the file, storing the file in the specified sub-volume;
      if the specified sub-volume lacks sufficient storage space to contain the file, storing the file in at least one media item of the auxiliary sub-volume; and
   if the command does not request storage of the file in a specified sub-volume, determining whether the specified sub-volume is listed in the file directory;
      if the specified sub-volume is not listed in the file directory storing the file in at least one media item of the auxiliary sub-volume;
      if the specified sub-volume is listed in the file directory, utilizing the file directory to identify a media item containing the file;
         determining whether the identified media item has sufficient storage space to store the file;
         if the identified media item has sufficient storage space to store the file, storing the file in the identified media item;
         if the identified media item lacks sufficient storage space to store the file, storing the file in at least one media item of the auxiliary sub-volume.

2. The method of claim 1, wherein the first predetermined number comprises one.

3. The method of claim 1, wherein the primary sub-volume embodies a single sub-directory.

4. The method of claim 1, wherein the second predetermined number comprises one.

5. The method of claim 1, wherein the third predetermined number comprises one.

6. The method of claim 1, further comprising the steps of providing each media item with a local file directory that, for each file stored on that media item, identifies the file and its storage location in the media item.

7. The method of claim 6, the file directory identifying all files stored in the sub-volumes and cross-referencing the files with their respective sub-volumes.

8. The method of claim 7, further comprising the steps of:
   receiving a command to delete a file;
   using the file directory and local file directory to identify at least one media item containing the file and the storage address therein;
   deleting the file from the identified at least one media item; and
   updating the file directory and local file directory.

9. The method of claim 1, further comprising the step of establishing a supply reservoir by making each of a plurality of unused media items available for inclusion in one of the sub-volumes.

10. The method of claim 9, further comprising the steps of expanding the primary sub-volume by selecting a media item of the supply reservoir, disassociating the selected media item from the supply reservoir, and designating the selected media item as part of the primary sub-volume.

11. The method of claim 9, further comprising the steps of expanding the secondary sub-volume by selecting a media item of the supply reservoir, disassociating the selected media item from the supply reservoir, and designating the selected media item as part of the secondary sub-volume.

12. The method of claim 9, further comprising the steps of expanding the auxiliary sub-volume by selecting a media item of the supply reservoir, disassociating the selected media item from the supply reservoir, and designating the selected media item as part of the auxiliary sub-volume.

13. The method of claim 9, further comprising the steps of:
   receiving a command to export a specified number of identified files;
   selecting at least one media item of the supply reservoir;
   copying the identified files to the selected media item;
   disassociating the selected media item from the supply reservoir; and
   extracting the selected media item from the library.

14. The method of claim 9, further comprising the steps of:
   receiving a command to export all files in a specified sub-directory;

if the specified sub-directory corresponds to the primary sub-volume, extracting all media items of the primary sub-volume from the library;

if the specified sub-directory corresponds to the secondary sub-volume, extracting all media items of the secondary sub-volume from the library; and if the specified sub-directory corresponds to the auxiliary sub-volume, selecting at least one media item of the supply reservoir, copying all files of the specified sub-directory to the selected at least one media item, disassociating the selected media item from the supply reservoir, and extracting the selected at least one media item from the library.

15. The method of claim 9, wherein the media items of the supply reservoir comprise previously unwritten media items.

16. The method of claim 9, wherein the media items of the supply reservoir comprise re-formatted media items.

17. The method of claim 9, wherein the media items of the supply reservoir comprise previously written but erased media items.

18. A method for managing file storage in a data storage library, comprising the steps of:

receiving an instruction to store a file;

if the file is associated with a first class of files, determining whether a first primary sub-volume has sufficient storage space to contain the file, said first primary sub-volume comprising at least one media item designated for storage of files of a first class;

if the first primary sub-volume has sufficient storage space to contain the file, storing the file in the first primary sub-volume;

if the first primary sub-volume lacks sufficient storage space to contain the file, allocating at least one media item from a media reservoir to the first primary sub-volume and storing the file in the at least one media item allocated to the first primary sub-volume;

if the file is of a second class of files, determining whether a second primary sub-volume has sufficient storage space to contain the file, said second primary sub-volume comprising at least one media item designated for storage of files of a second class;

if the second primary sub-volume has sufficient storage space to contain the file, storing the file in the second primary sub-volume;

if the second primary sub-volume lacks sufficient storage space to contain the file, allocating at least one media item from the media reservoir to the second primary sub-volume and storing the file in the at least one media item allocated to the second primary sub-volume;

if the file is not associated with the first or second class of files, determining whether the specified sub-volume is listed in a file directory listing files contained in the first and second primary sub-volumes;

if the specified sub-volume is not listed in the file directory, storing the file in at least one media item of an auxiliary sub-volume;

if the specified sub-volume is listed in the file directory, utilizing the file directory to identify a media item containing the file;

determining whether the identified media item has sufficient storage space to store the file;

if the identified media item has sufficient storage space to store the file, storing the file in the identified media item;

if the identified media item lacks sufficient storage space to store the file, storing the file in at least one media item of the auxiliary sub-volume.

19. The method of claim 18, further comprising the steps of:

maintaining the media reservoir to supply media items for inclusion into expanding sub-volumes, to receive receiving media items added to the library, and to receive media items disassociated from the sub-volumes.

20. The method of claim 19, the file directory referencing names of files stored in the auxiliary sub-volume with addresses of said stored files in the auxiliary sub-volume.

21. An article of manufacture comprising at least one data storage medium tangibly embodying a program of machine-readable instructions executable by a digital data processing apparatus to perform method steps to manage file storage in a data storage library, said method steps comprising:

establishing a primary sub-volume by designating a first predetermined number of media items for storage of a first class of files and storing files of the first class in the primary sub-volume;

establishing a secondary sub-volume by designating a second predetermined number of media items for storage of a second class of files and storing files of the second class in the secondary sub-volume;

establishing an auxiliary sub-volume by designating a third predetermined number of media items for storage of files not of the first or second classes;

establishing a file directory listing files contained in the primary and secondary sub-volumes;

receiving a command to store a file;

if the command requests storage of the file in a specified sub-volume, determining whether the specified sub-volume has sufficient storage space to contain the file;

if the specified sub-volume has sufficient storage space to contain the file, storing the file in the specified sub-volume;

if the specified sub-volume lacks sufficient storage space to contain the file, storing the file in at least one media item of the auxiliary sub-volume; and if the command does not request storage of the file in a specified sub-volume, determining whether the specified sub-volume is listed in the file directory;

if the specified sub-volume is not listed in the file directory, storing the file in at least one media item of the auxiliary sub-volume;

if the specified sub-volume is listed in the file directory, utilizing the file directory to identify a media item containing the file;

determining whether the identified media item has sufficient storage space to store the file;

if the identified media item has sufficient storage space to store the file, storing the file in the identified media item;

if the identified media item lacks sufficient storage space to store the file, storing the file in at least one media item of the auxiliary sub-volume.

22. An article of manufacture comprising at least one data storage medium tangibly embodying a program of machine-readable instructions executable by a digital data processing apparatus to perform method steps to manage file storage in a data storage library, said method steps comprising:

receiving an instruction to store a file;

if the file is associated with a first class of files, determining whether a first primary sub-volume has sufficient storage space to contain the file, said first primary sub-volume comprising at least one media item designated for storage of files of a first class;

if the first primary sub-volume has sufficient storage space to contain the file, storing the file in the first primary sub-volume;

if the first primary sub-volume lacks sufficient storage space to contain the file, allocating at least one media item from a media reservoir to the first primary sub-volume and storing the file in the at least one media item allocated to the first primary sub-volume;

if the file is of a second class of files, determining whether a second primary sub-volume has sufficient storage space to contain the file, said second primary sub-volume comprising at least one media item designated for storage of files of a second class;

if the second primary sub-volume has sufficient storage space to contain the file, storing the file in the second primary sub-volume;

if the second primary sub-volume lacks sufficient storage space to contain the file, allocating at least one media item from the media reservoir to the second primary sub-volume and storing the file in the at least one media item allocated to the second primary sub-volume;

if the file is not associated with the first or second class of files, determining whether the specified sub-volume is listed in a file directory listing files contained in the first and second primary sub-volumes;

if the specified sub-volume is not listed in the file directory, storing the file in at least one media item of an auxiliary sub-volume;

if the specified sub-volume is listed in the file directory, utilizing the file directory to identify a media item containing the file;

determining whether the identified media item has sufficient storage space to store the file;

if the identified media item has sufficient storage space to store the file, storing the file in the identified media item;

if the identified media item lacks sufficient storage space to store the file, storing the file in at least one media item of the auxiliary sub-volume.

23. A mass storage system, comprising:

a controller;

a storage library of media items, comprising:

a number of primary sub-volumes, each particular sub-volume including a number of media items containing files limited to a specified class associated with that particular sub-volume;

a floating sub-volume comprising a number of media items containing files of multiple classes each different than the specified classes; and a supply reservoir comprising a plurality of unused media items for selective incorporation into the sub-volumes; and a conveyor, coupled to the controller, to exchange media items between the library and the controller;

wherein the controller is programmed to perform method steps to manage file storage in the storage library, said method steps comprising:

establishing a file directory listing files contained in the primary and floating sub-volumes;

receiving a command to store a file;

if the command requests storage of the file in a specified one of the primary sub-volumes, determining whether the specified sub-volume has sufficient storage space to contain the file;

if the specified sub-volume has sufficient storage space to contain the file, storing the file in the specified sub-volume;

if the specified sub-volume lacks sufficient storage space to contain the file, storing the file in at least one media item of the floating sub-volume; and if the command does not request storage of the file in a specified one of the primary sub-volumes, determining whether the specified sub-volume is listed in the file directory;

if the specified sub-volume is not listed in the file directory, storing the file in at least one media item of the floating sub-volume;

if the specified sub-volume is listed in the file directory, utilizing the file directory to identify a media item containing the file;

determining whether the identified media item has sufficient storage space to store the file;

if the identified media item has sufficient storage space to store the file, storing the file in the identified media item;

if the identified media item lacks sufficient storage space to store the file, storing the file in at least one media item of the floating sub-volume.

24. The mass storage system of claim 23, wherein each media item includes a local file directory that, for each file stored on that media item, identifies the file and its storage location in the media item.

25. The mass storage system of claim 23, the file directory identifying all files stored in the sub-volumes and cross-referencing the files with their respective sub-volumes.

26. The mass storage system of claim 23, wherein all files in each primary sub-volume reside together in one subdirectory.

27. The mass storage system of claim 23, wherein the files of the floating sub-volume reside in multiple subdirectories.

* * * * *